Aug. 23, 1955   C. A. SHUTTLEWORTH   2,715,957
CONTAINER FEED MANIPULATING DEVICE
Filed Sept. 6, 1952
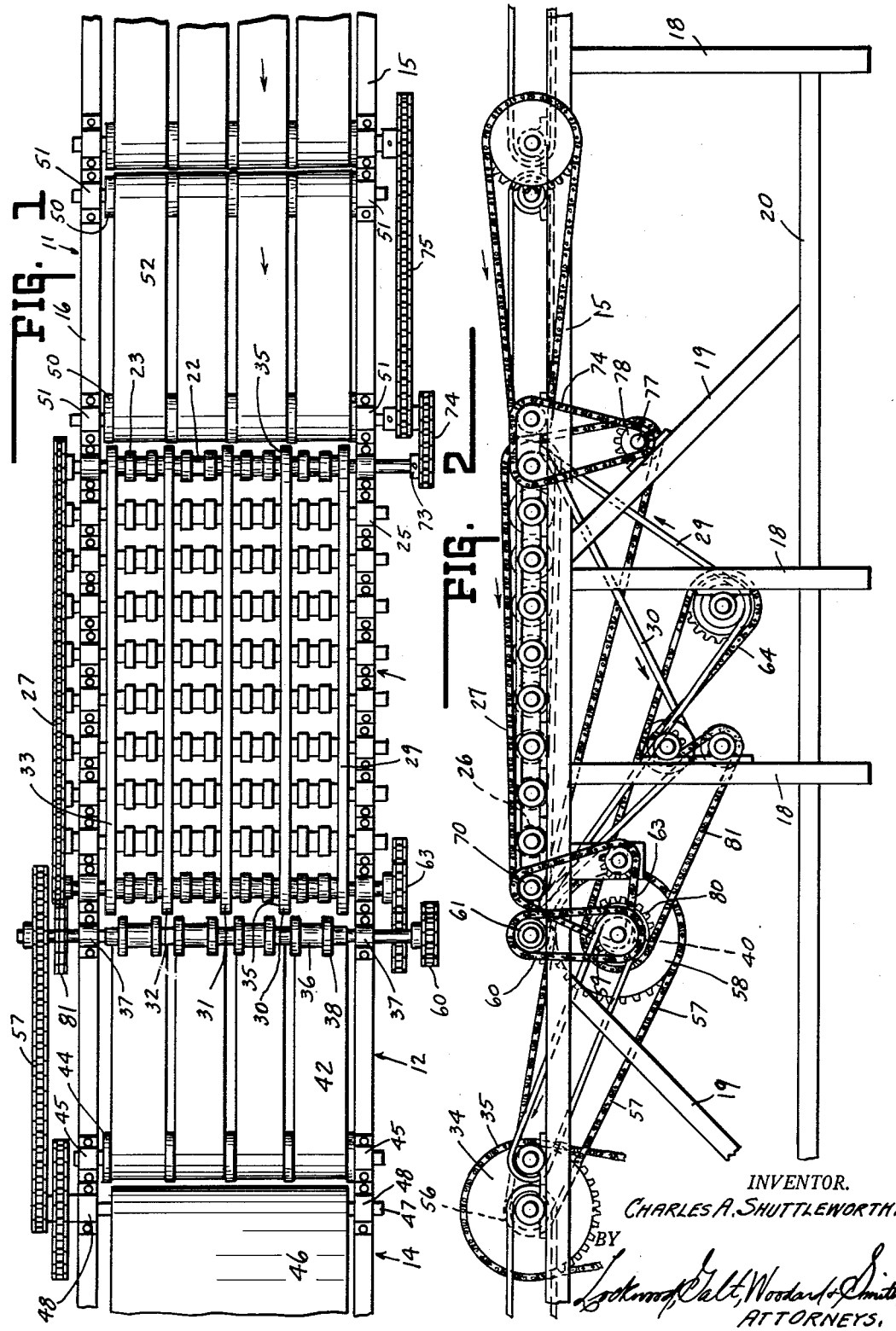
INVENTOR.
CHARLES A. SHUTTLEWORTH.
BY
Lockwood, Galt, Woodard & Smith
ATTORNEYS.

United States Patent Office 2,715,957
Patented Aug. 23, 1955

2,715,957

CONTAINER FEED MANIPULATING DEVICE

Charles A. Shuttleworth, Warren, Ind.

Application September 6, 1952, Serial No. 308,208

8 Claims. (Cl. 198—33)

This invention relates generally to conveyors for handling containers and more particularly to conveyors adapted to manipulate containers by arranging them in rows in vertical or standing position. This invention is an improvement over that shown in my co-pending application, Serial No. 199,983 filed December 9, 1950, and now Patent No. 2,637,433.

Prior conveyors, adapted to manipulate containers such as cans, receive containers arranged in random positions, either forming a single layer on a conveyor belt or being piled on a conveyor belt to form a number of layers. As the machine operates to manipulate the containers, the containers are first arranged in rows lying on their sides with their longitudinal axes approximately parallel to the direction of movement of the conveyor. However, exact parallelism is necessary for foolproof operation. As a result of the rearrangement or manipulation, the containers require more longitudinal space as they progress along the manipulating device. No provisions have been made for increasing the speed of travel as the containers progress along the manipulating device and, therefore, the overall rate of travel of the containers is lessened whereby the overall efficiency of the machines is impaired.

The principal object of this invention is to provide improved apparatus having positively acting means for manipulating cans or other containers from random positions on a conveyor to positions in rows with each container standing in a vertical position.

Still another object of this invention is to provide apparatus for manipulating cans or other containers which provides increased rate of travel of the containers as they are manipulated into rows extending longitudinally of the apparatus.

In accordance with this invention there is provided a container manipulating device including a series of rollers adapted to receive containers arranged in scrambled positions, a plurality of oppositely travelling belts associated with the rollers for throwing containers into rows as they progress along the rollers, and a means for driving successive rollers at successively increasing speeds, thereby to increase the rate of travel of the containers as they assume their intended positions in rows.

The full nature of the invention will be understood from the accompanying drawings and the following description and claims:

Fig. 1 is a top plan view illustrating the manipulating device of this invention in cooperative relationship with conventional conveyor sections.

Fig. 2 is a front elevational view of the mechanism illustrated in Fig. 1.

In accordance with this invention there is provided a container manipulating device 10 which is adapted to receive containers scattered in random positions on a receiving conveyor section 11, to rearrange the containers as they progress longitudinally of the manipulating device and to discharge them onto a conveyor section 12 where they are erected in an upright position and arranged in rows for travel in accordance with this arrangement on another conveyor section 14.

The above described mechanisms consist of a pair of longitudinal support members 15 and 16 which may comprise channels or angles of suitable size and strength. For supporting these members in horizontally spaced relationship to one another, there are provided legs 18, diagonal braces 19 and longitudinal stringers 20, all of which may be welded or bolted together in accordance with conventional structural assembly methods.

The manipulator section 10 consists of a series of identical rollers 22 having spaced, annular, rubber collars 23 thereon for the purpose of engaging the curved surfaces of the containers as they progress from one roller to another and aligning them in comparative precise alignment with one another in parallel rows. Collars 23 may be so spaced that cans, bottles or the like naturally nest between the collars. The rollers 22 may be supported on the longitudinal frame members 15 and 16 by means of pillow blocks 25. At the upper ends of the rollers (Fig. 1) there are provided sprocket wheels 26 in operative engagement with a conventional roller chain 27. It will be noted from the drawings that the sprockets 26 are of successively lesser diameter progressing from right to left (Fig. 1) whereby each of the rollers may be rotated at successively greater speed for imparting an increasing rate of travel to the containers as they progress from right to left along the manipulating device.

Manipulating device 10 further comprises a plurality of spaced V belts 29, 30, 31, 32 and 33, each of which may travel over pulleys 35 mounted freely on the rollers 22 for rotation independently of these rollers. The belts 29, 31 and 33, for example, are driven in the direction of travel of the containers, at a speed greater than the rate of travel, while belts 30 and 32 may be driven in a direction opposite to the direction of travel of the containers, whereby adjacent belts may engage opposite ends of a can or container and rotate the container into a position where it naturally falls between adjacent collars 23 with its longitudinal axis parallel to the direction of travel of the container. The belts also function when they engage only one end of a container as they necessarily tend to throw that one end of the container to such a position that the longitudinal axis of the container is parallel to its direction of travel. At the left hand end of the manipulating device there is provided a setting-up roller 36 mounted for rotation on frame members 15 and 16 by means of pillow blocks 37. The rate of rotation of this roller is less than that of rollers 22. Roller 36 includes spaced rubber collars 38 which are spaced at intervals greater than those between the collars 23 on rollers 22, and which have slightly larger diameter. Because of the larger diameter and greater spacing of these collars, roller 36 tends to grasp the containers as they come off the last roller 22. The combined grasping action of roller 36 with its slower rate of rotation together with the momentum of the containers causes the containers to move toward an upright position.

In order to complete erection of the containers into a vertical position, the right hand end of conveyor section 12 includes a roller 40 mounted on suitable pillow blocks (not shown) below the roller 36. Roller 40 rotatably supports a plurality of individual conveyor belts 42 which are in alignment with rows of adjacent collars 23, whereby each belt 42 receives a row of containers. The belts 42 function to receive containers in vertical position after they roll over roller 36. Thus the containers are erected in a substantially vertical position. The other end of conveyor section 12 comprises a roller 44 mounted on pillow blocks 45 in turn fastened to frame members 15 and 16, whereby the belts 42 extend from the level of roller 40 below rollers 22 up to the level of rollers 22 for conveying the containers back to their original level of travel.

For conveying the containers from there on there is provided another conveyor section 14 having a belt 46 supported on frame members 15 and 16 by means of a roller mounted on the shaft 47 rotatably mounted in pillow blocks 48.

The containers may be fed to the manipulating section 10 by means of the conveyor section 11, which consists of a pair of spaced rollers 50 rotatably mounted in the pillow blocks 51 and supporting the individual conveyor belt sections 52. The containers may be dumped at random on the belts 52 whereby they assume various angular positions either in a single layer or in multiple layers for travel into engagement with the rollers 22.

For driving the belts of the conveyor sections and the rollers of the manipulating section, there is provided a main drive sprocket 54 which may be driven from a main drive motor (not shown) by means of the chain 55. Mounted on the same shaft with drive sprocket 54 is a sprocket 56 for driving a chain 57, which in turn drives a sprocket 58 mounted on a shaft extension of the roller 40, thereby to rotate the roller 40 and a sprocket 59 mounted on a second shaft extension of roller 40 at the lower end thereof (Fig. 1). Sprocket 59 in turn drives chain 60, thereby to drive a sprocket 61 mounted on a shaft extension of the roller 36 and imparting rotational movement thereto.

For driving the rollers 22 there is provided a chain 63 which may be driven from a sprocket mounted on the shaft extension of roller 40 adjacent to the sprocket 59 and passing over a sprocket 70 mounted on the lower end of the last of the rollers 22, thereby to drive this roller. At the opposite end of this last roller 22 there is mounted a drive sprocket adapted to engage the chain 27, which in turn engages each of the sprockets 26 mounted at the upper ends of the rollers 22. As mentioned before, each of these sprockets is progressively smaller from right to left (Fig. 1) whereby the rollers rotate at progressively greater speeds from right to left.

The conveyor section 11 may be driven by means of a sprocket 73 mounted on the lower end of the shaft of right hand roller 22 in engagement with a chain 74 running over a sprocket mounted on the lower end of a shaft extending from the roller 50, thereby to drive this roller and the belts 52. If it is so desired, the shaft of roller 50 may be utilized for driving a sprocket and chain 75 which extends into driving relationship with a conveyor section preceding section 11. For spacing the return portion of chain 27 below the rollers 22, there may be provided a countershaft 77 and auxiliary sprocket 78.

For driving the belts 29, 30, 31, 32 and 33 there may be provided a sprocket 80, mounted at the upper end of the shaft of roller 40, in driving relation to the chain 81. Chain 81 extends over an idler sprocket 82 into engagement with a first belt driving sprocket 83 mounted on shaft 84 and further into engagement with a second belt driving sprocket 86 mounted on a shaft 87. In order to drive belts 30 and 32 in a direction opposite to the direction of travel of the containers, drive pulleys 89 for each of these belts may be mounted on the shaft 84 since this shaft rotates in a reverse direction with respect to the direction of rotation of the roller 36. For driving the belts 29, 31 and 33 in the same direction as the direction of travel of the containers, a pair of pulleys 90 may be mounted on the shaft 87 which rotates in the same direction as roller 36. The drive mechanism is designed to drive belts 29, 31 and 33 at a speed exceeding the rate of travel of the containers. By means of this drive arrangement adjacent belts in the manipulator section 10 travel in opposite directions, whereby they move the ends of any cans engaging them onto the collars 23 between the respective belts, thereby to align the containers into parallel rows.

In operation, containers may be dumped or scattered at random on the conveyor section 11 or on preceding conveyor sections where they immediately start travelling toward the manipulator section 10. As the cans flow onto the manipulator section certain of them may be in longitudinal alignment and fall between the collars 23 on the rollers 22. However, certain of the containers will be in a position such that one or both ends thereof will be engaged by belts such for example as 29 and 30. Since these belts travel in opposite directions, the opposite ends of a given container will be moved in opposite directions until they lose engagement with the belts, at which time they will have nested between collars 23 with their longitudinal axes parallel to the direction of travel of the containers. As the containers reach the left hand end of the manipulator section, they become engaged with roller 36 and its collars 38. This roller rotates more slowly than adjacent roller 23 whereby it tends to check forward movement of the containers and the momentum thereof tends to erect the containers so that they fall toward the conveyor belts 42 in an upright position. Thus the containers stand erect on the belts 42 in aligned rows and are moved upwardly onto the belt 46 of the next conveyor section 14.

From the foregoing description it will be obvious that the rollers 22 and the belts 29, 30, 31, 32 and 33 serve to align the containers in parallel rows and move the containers at progressively greater speeds as they become aligned with one another. Because of the increased speed of travel, space is automatically provided for alignment of following containers, whereby all of the containers progress along the manipulating device without loss of travel speed. The collars 23 serve to provide precise alignment thereby assuring that the cans will assume an upright position as they fall from roller 36. Collars 23 may be modified, for example, by providing cylindrical members adapted to be mounted on rollers 22, these members having a concave outer surface.

The invention claimed is:

1. A container feed manipulating device for receiving containers in scattered arrangement and erecting them in parallel rows comprising a frame, a plurality of parallel rollers mounted on said frame with their centers in a common plane for unidirectional rotational movement and including container aligning means thereby to provide lateral movement of said containers with their longitudinal axes in a horizontal plane and extending in the direction of container travel, drive means operatively associated with said rollers for providing progressively increased speed of container travel, and means operatively associated with said rollers for moving said containers into engagement with said aligning means.

2. A container feed manipulating device for receiving containers in scattered arrangement and erecting them in parallel rows comprising a frame, a plurality of parallel rollers mounted on said frame with their centers in a common plane for unidirectional rotational movement and including container aligning means thereby to provide lateral movement of said containers with their longitudinal axes in a horizontal plane and extending in the direction of container travel, spaced belts running on said rollers in opposite directions for defining parallel paths of movement for said containers and moving them into said paths, and means adjacent the last propelling roller for checking the movement of the containers, thereby to cause their momentum to provide a setting-up movement of said containers.

3. A container feed manipulating device for receiving containers in scattered arrangement and erecting them in parallel rows comprising a frame, a plurality of parallel rollers mounted on said frame with their centers in a common plane for unidirectional rotational movement and including container aligning means thereby to provide lateral movement of said containers with their longitudinal axes in a horizontal plane and extending in the direction of container travel, drive means operatively associated with said rollers for providing progressively increased speed of container travel, means operatively associated with said rollers for defining parallel paths of movement for said containers and moving them into said paths, and means adjacent the last propelling roller for checking the movement of the containers, thereby to cause their momentum to provide a setting-up movement of said containers.

4. A container feed manipulating device for receiving containers in scattered arrangement and erecting them in parallel rows comprising a frame, a plurality of parallel rollers mounted on said frame with their centers in a common plane for unidirectional rotational movement and including container aligning means thereby to provide lateral movement of said containers and extending in the direction of container travel, and spaced belts running in a plane above said rollers at different relative speeds for defining parallel paths of movement for said containers and moving them into said paths.

5. A container feed manipulating device for receiving containers in scattered arrangement and erecting them in parallel rows comprising a frame, a plurality of parallel rollers mounted on said frame with their centers in a common plane for unidirectional rotational movement and including container aligning means thereby to provide lateral movement of said containers with their longitudinal axes in a horizontal plane and extending in the direction of container travel, drive means operatively associated with said rollers for providing progressively increased speed of container travel, spaced belts running on said rollers in opposite directions for defining parallel paths of movement for said containers and moving them into said paths, and a final roller travelling at slower speed than the last propelling roller, thereby to cause the momentum of containers to provide a setting-up movement of said containers.

6. A container feed manipulating device for receiving containers in scattered arrangement and erecting them in parallel rows comprising a frame, a plurality of parallel rollers mounted on said frame with their centers in a common plane for unidirectional rotational movement and including container aligning means thereby to provide lateral movement of said containers with their longitudinal axes in a horizontal plane and extending in the direction of container travel, drive means operatively associated with said rollers for providing progressively increased speed of container travel, spaced pulleys mounted for free rotation on certain of the rollers, belts running in said pulleys for defining parallel paths of movement for said containers, a final roller travelling at slower speed than the last aligning roller, thereby to cause the momentum of containers to provide a setting-up movement of said containers, a drive means coupled to said setting-up roller, and an auxiliary drive means coupled to said main drive means for driving alternate ones of said belts in opposite directions to rotate said containers into longitudinal alignment.

7. A container feed manipulating device for receiving containers in scattered arrangement and erecting them in parallel rows comprising a frame, a plurality of parallel rollers mounted on said frame with their centers in a common plane for unidirectional rotational movement thereby to provide lateral movement of said containers with their longitudinal axes in a horizontal plane, spaced collars on said rollers for guiding said containers into a position with their longitudinal axes extending in the direction of container travel, drive means operatively associated with said rollers for providing progressively increased speed of container travel, spaced pulleys mounted for free rotation on the end rollers, belts running in said pulleys for defining parallel paths of movement for said containers, a final roller travelling at slower speed than the last aligning roller, thereby to cause the momentum of containers to provide a setting-up movement of said containers, drive means coupled to said setting-up roller, an auxiliary drive means coupled to said main drive means for driving alternate ones of said belts in opposite directions to rotate said containers into longitudinal alignment, and conveyor means below said setting-up roller for receiving said containers in an upright position and continuing their travel in this position.

8. A container feed manipulating device for receiving containers in scattered arrangement and erecting them in parallel rows comprising a frame, a plurality of parallel rollers mounted on said frame with their centers in a common plane for unidirectional rotational movement thereby to provide lateral movement of said containers, said rollers being spaced from one another to move upright containers into a position with their longitudinal axes in a horizontal plane, spaced collars on said rollers for guiding said containers into a position with their longitudinal axes extending in the direction of container travel, drive sprockets on said rollers having a progressively smaller number of teeth in the direction of container travel, a drive chain common to said sprockets thereby to provide progressively increased speed of container travel, spaced pulleys mounted for free rotation on the end rollers, belts running in said pulleys for defining parallel paths of movement for said containers, a final roller travelling at slower speed than the last aligning roller, thereby to cause the momentum of containers to provide a setting-up movement of said containers, a main drive means coupled to said chain and said setting-up roller, an auxiliary drive means coupled to said main drive means for driving alternate ones of said belts in opposite directions to rotate said containers into longitudinal alignment, and conveyor means below said setting-up roller for receiving said containers in an upright position and continuing their travel in this position.

References Cited in the file of this patent

UNITED STATES PATENTS

| | | |
|---|---|---|
| 770,260 | Cahill | Sept. 20, 1904 |
| 2,531,292 | Page | Nov. 21, 1950 |
| 2,555,193 | Johnson | May 29, 1951 |
| 2,633,971 | Albertoli | Apr. 7, 1953 |